US006287623B1

(12) United States Patent
Nakayama et al.

(10) Patent No.: US 6,287,623 B1
(45) Date of Patent: Sep. 11, 2001

(54) PROTEIN-CONTAINING ACIDIC FOODS AND DRINKS

(75) Inventors: Motokazu Nakayama; Ayako Muromachi, both of Tsuchiura; Shinpei Harada, Tsukuba; Iwao Sato, Tsuchiura, all of (JP)

(73) Assignee: Kyowa Hakko Kogyo Co., Ltd., Tokyo (JP)

( * ) Notice: Subject to any disclaimer, the term of this patent is extended or adjusted under 35 U.S.C. 154(b) by 0 days.

(21) Appl. No.: 09/185,631

(22) Filed: Nov. 4, 1998

(30) Foreign Application Priority Data

Nov. 7, 1997 (JP) ................................................. 9-305742
Apr. 13, 1998 (JP) ................................................ 10-101440

(51) Int. Cl.⁷ ................................ A23G 1/00; A23C 9/16
(52) U.S. Cl. .......................... 426/584; 426/585; 426/588; 426/599; 426/800; 426/801
(58) Field of Search .............................. 426/330.2, 330.3, 426/330.5, 584, 585, 588, 599, 573, 519, 800, 801

(56) References Cited

U.S. PATENT DOCUMENTS

| 3,800,052 | | 3/1974 | Inagami et al. ........................ 426/359 |
| 4,079,154 | * | 3/1978 | Yasumatsu ............................. 426/583 |
| 4,401,657 | * | 8/1983 | Kashiwabara et al. ............... 424/177 |
| 4,530,850 | * | 7/1985 | Trop ....................................... 426/584 |
| 4,563,356 | * | 1/1986 | Fujisawa et al. ........................ 426/44 |
| 4,676,988 | * | 6/1987 | Efstathiou et al. .................... 426/271 |
| 5,360,624 | * | 11/1994 | Okura et al. ........................... 426/573 |
| 5,580,600 | * | 12/1996 | Strong et al. ........................... 426/585 |

FOREIGN PATENT DOCUMENTS

| 0246747 | | 11/1987 | (EP) . |
| 0323510 | | 7/1989 | (EP) . |
| 765609 | * | 4/1997 | (EP) . |
| 791297 | * | 8/1997 | (EP) . |
| 48035470 | | 4/1973 | (JP) . |
| 4835470 | | 10/1973 | (JP) . |
| 49020508 | | 5/1974 | (JP) . |
| 59091839A | * | 5/1984 | (JP) . |
| 01020057 | | 1/1989 | (JP) . |
| 6420057 | | 1/1989 | (JP) . |
| 01157365 | * | 6/1989 | (JP) . |
| 08056567 | | 3/1996 | (JP) . |
| 2510435 | | 4/1996 | (JP) . |
| 08280366 | | 10/1996 | (JP) . |
| 1052224 | | 2/1998 | (JP) . |

* cited by examiner

Primary Examiner—Nina Bhat
(74) Attorney, Agent, or Firm—Antonelli, Terry, Stout & Kraus, LLP

(57) ABSTRACT

Provided are a method for producing a protein-containing acidic food and drink that comprises processing a protein emulsion having a pH value that is higher than the isoelectric point of the protein in the emulsion at a high temperature to make the emulsion having a pH value that is lower than the isoelectric point of the protein; the protein-containing acidic food and drink produced in the method; protein-containing acidic food and drink containing protein, fat and oil, and water-soluble polysaccharide, in which the particles dispersed have a mean particle size of not greater than 15 $\mu$m; and a protein-containing acidic drink containing protein, fat and oil, and water-soluble polysaccharide, in which the particles dispersed have a mean particle size of not greater than 15 $\mu$m and/or having a viscosity not greater than 20 centipoises (cPs). The protein-containing acidic food and drink is smooth, tasteful, palatable and has good storage stability.

29 Claims, No Drawings

PROTEIN-CONTAINING ACIDIC FOODS AND DRINKS

FIELD OF THE INVENTION

The present invention relates to protein-containing acidic foods and drinks which are smooth, tasteful, palatable and have good storage stability.

BACKGROUND OF THE INVENTION

Known examples of protein-containing acidic food and drink are acidic milk drinks. These acidic milk drinks are typically prepared by adding sours such as fruit juices, acidic electrolytes and the like to the main component of fermented milk that is obtained through fermentation of milk with lactic acid bacteria or yeasts. However, fermented milk has little taste for refreshment, and, in addition, it coagulates to a rough and non-smooth texture when electrolytes, fats and oils are added thereto.

Known methods for producing smooth, acidic milk drinks, for example, include: a method of homogenizing a raw material mixture that comprises acidic milk, pectin and a calcium-containing component, and a method of homogenizing a raw material mixture that comprises acidic milk and pectin followed by adding calcium thereto (Japanese Unexamined Patent Publication No. 56567/96); and a method of forming fat-containing, condensed sour milk beverage containing lactic acid bacteria through high pressure homogenization, which are characterized by stable fat dispersion therein (Japanese Unexamined Patent Publication No. 20057/89). However, even in these methods, the smoothness of the acidic milk drinks obtained is still unsatisfactory.

On the other hand, long-term storage of acidic milk drinks is difficult. In general, acidic milk drinks can only be distributed in the market at low temperatures and for a period of 2 weeks or so. In order to distribute acidic milk drinks in the market at room temperature for a longer period of time, they must be further treated. For example, they must be sterilized by ultra-high-temperature flash pasteurization (UHT) or retorting. Alternatively, fermented milk is processed with an acid added thereto, thereby having a pH of not higher than 4.0, and thereafter this is subjected to cold pasteurization. In those sterilization methods, however, acidic milk drinks generally coagulate.

On the other hand, known methods for producing acidic milk drinks that are not derived from fermented milk include: a method of adding stabilizers (Japanese Examined Patent Publication No. 35470/73, Japanese Unexamined Patent Publication No. 280366/96, etc.), or a method of adding saccharides (U.S. Pat. No. 3,800,052); and a method of solubilizing protein in milk with strong acids (Japanese Unexamined Patent Publication No. 20508/74), etc.

However, in those methods for producing acidic milk products that do not start with fermented milk, most proteins that are present in the starting milk pass through their own isoelectric point, and coagulate when they pass through the isoelectric point. This means that good products are difficult to produce.

For these reasons, few protein-containing acidic drinks are known other than the acidic milk drinks that are produced from fermented milk.

On the other hand, there is increasing a demand for liquid nutrients such as thick liquid diets that contain protein as the nitrogen source. Many of conventional liquid nutrients that contain protein as the nitrogen source are processed to a pH value that falls within a neutral range. However, the nutrients that are processed to have a pH value that falls within a neutral range are defective in that they often taste oily and their taste is bad. Therefore, it is desirable to develop protein-containing acidic foods and drinks such as acidic liquid nutrients, etc. However, even in the process of producing high-protein, acidic liquid nutrients, the same problems occur as in the process of producing acidic milk drinks not from fermented milk. In particular, when liquid nutrients are made and are supplemented with electrolytes such as minerals, water-soluble vitamins and the like, the coagulation of protein is promoted by the electrolytes when the protein passes through its isoelectric point. Therefore, in that case, good acidic liquid nutrients are difficult to obtain.

On the other hand, as nutrient supplements for aged persons having lowered chewing and swallowing power, protein-containing semi-solid foods such as jellies, puddings, etc. are desirable. However, for the same reasons as those for protein-containing acid drinks noted above, it is difficult to produce acidic, protein-containing semi-solid foods.

SUMMARY OF THE INVENTION

The present invention provides a protein-containing acidic food and drink which is smooth, tasteful, palatable and have good storage stability, as well as a method for producing them.

Specifically, the invention provides a method for producing a protein-containing acidic food and drink, which comprises processing a protein emulsion having a pH value that is higher than the isoelectric point of the protein in the emulsion at a high temperature to make the emulsion having a pH value that is lower than the isoelectric point of the protein; the protein-containing acidic food and drink obtainable by the method; a protein-containing acidic food and drink containing protein, fat and oil, and water-soluble polysaccharide, in which the particles dispersed have a mean particle size of not greater than 15 μm; and a protein-containing acidic drink containing protein, fat and oil, and water-soluble polysaccharide, in which the particles dispersed have a mean particle size of not greater than 15 μm and/or having the viscosity of not greater than 20 centipoises (cPs).

DETAILED DESCRIPTION OF THE INVENTION

A protein-containing acidic food and drink referred to herein means foods and drinks which are acidic and which contain proteins. Preferably, a food and drink has a pH value falling between 2.5 and 5.0 in order to have a good sour taste, but more preferably has a pH value of between 2.5 and 4.0 in order to have a better taste for refreshment. The protein content of the protein-containing acidic food and drink can depend on the desired end product. However, the protein content is preferably from 0.1 to 10% by weight, more preferably from 0.5 to 7% by weight in order that the food and drink could be smooth.

Protein-containing acidic food and drink includes, for example, acidic drink to be prepared by adding sour or the like to protein-containing drink such as milk, soy milk, etc.; protein-containing acidic drink, for example, acidic liquid nutrient such as acidic, thick liquid diet that contains protein as the nitrogen source; protein-containing acidic semi-solid food to be produced by semi-solidifying protein emulsion, which is prepared in the same manner as in the production of protein-containing acidic drink noted above, into jellie, paste, etc.

To prepare the product of the present invention, any suitable protein usable in foods, drinks and medicines can be used, and preferably used are proteins usable in foods and drinks. Typical proteins for use in the present invention include, for example, any one or more of natural protein material having a high content of vegetable protein, animal protein, milk protein, etc.; as well as low-purity protein and high-purity protein derived from such natural protein material, etc. The protein for use in the invention may be any of those as processed through any one or more of chemical treatment, enzymatic treatment, physical treatment or the like (processed proteins), for example, hydrolyzed, acylated, alkylated, esterified, phosphorylated, glycosylated, hydroxylated, methylated, oxidized or reduced protein; or those in the form of salt with alkali metal, alkaline earth metal or the like (protein salt). Specific examples of the protein for use in the invention include soybean protein, wheat protein such as gluten, corn protein, plasma protein, blood cell protein, egg white protein, egg yolk protein, meat protein, fish protein, milk protein such as casein, whey protein, collagen, gelatin, albumin, globulin, fibrin, fibrinogen, etc.

In accordance with a preferred aspect of the present invention, protein having an isoelectric point that falls within a pH range between 3.5 and 7.0, such as soybean protein, milk protein, albumin, gelatin, etc. is used. For whey protein, egg white protein and other proteins that are easily denatured under heat, it is desirable that they are used in the form of their hydrolysates or partial hydrolysates.

Protein emulsion having a pH value that is higher than the isoelectric point of the protein existing therein includes, for example, protein drink such as milk, soy milk, etc. Apart from those, protein emulsion of that type may be prepared by dissolving or dispersing a protein in an aqueous medium having a pH value that is higher than the isoelectric point of the protein, preferably in an amount of from 0.1 to 15.0% by weight, more preferably from 0.5 to 10.0% by weight to form a protein solution, then adding thereto any of fats and oils along with an emulsifier, and thereafter stirring and emulsifying the resulting mixture.

The aqueous medium as referred to herein is water or a solvent containing water as the major component. The solvent containing water as the major component is not specifically defined, and may contain any other components within the range not interfering with the formation of the intended protein emulsions.

Any edible fat and oil is employable herein, which includes, for example, any one or more of vegetable fat and oil such as soybean oil, corn oil, etc.; animal fat and oil such as tallow, milk fat, etc.; MCT (middle-chain fatty acid triglyceride), etc.

Fat and oil may be added to the protein emulsion in such a manner that the fat and oil content of the protein emulsion is preferably from 0.1 to 10% by weight, more preferably from 0.5 to 6% by weight. If the fat and oil content is smaller than 0.1% by weight, the final product to be obtained herein will lose a smooth taste; but if greater than 10% by weight, the protein emulsion will be unstable under an acidic condition and the final product will have an unpleasant fatty taste.

As the emulsifier, any suitable edible emulsifier can be used. Typical examples of suitable emulsifiers include, for example, any one or more of lecithin, lysolecithin, glycerin fatty acid ester, sucrose fatty acid ester, organic acid monoglyceride, etc.

The amount of the emulsifier to be added varies. The amount can depend on the protein solution to which it is added, the fat and oil to be added to the protein solution along with it, and even the type of the emulsifier itself. Anyhow, the emulsifier may be added to a protein solution to such a degree that the emulsified condition of the final product of protein-containing acidic food and drink of the invention can be kept stable.

Fat and oil and an emulsifier are added to a protein solution, and the resulting mixture is stirred and emulsified using, for example, a colloid mill, a homo-mixer, a high-pressure homogenizer, an ultra-high-pressure homogenizer or the like, to obtain a protein emulsion. For example, when a high-pressure homogenizer is used for the emulsification, the mixture may be processed under a pressure of 100 kg/cm$^2$ or higher.

Where a protein contained in a protein-containing acidic food and drink is casein, the raw protein for those may be any of natural protein materials having a high casein content, for example, animal milk such as cow milk, goat milk, sheep milk, horse milk, etc.; and low-purity casein and high-purity casein derived from such natural protein material. Casein to be used herein may be in any form, for example, it may be processed through chemical treatment, enzymatic treatment, physical treatment or the like (processed caseins), or may be in the form of its salts (casein salt).

Examples of casein emulsion having a pH value that is higher than the isoelectric point of casein of about pH 4.5 or so, include animal milk. Casein emulsion may be prepared by dissolving or dispersing a raw protein material in an aqueous medium having a pH value that is higher than the isoelectric point of casein to form a casein solution, then adding thereto any of fats and oils along with an emulsifier, and thereafter stirring and emulsifiying the resulting mixture.

The protein content of the protein emulsion can be dependent on the desirable end product. However, typically, it is preferably from 0.1 to 10% by weight, more preferably from 0.5 to 7% by weight, in order that the final product, protein-containing acidic food and drink of the invention can be smooth.

Water-soluble polysaccharide, if added to the protein emulsion, may prevent the coagulation of the emulsion while the emulsion is processed at a high temperature so as to have a pH value lower than the isoelectric point of the protein therein. Therefore, it is desirable to add water-soluble polysaccharide to the protein emulsion prior to the high-temperature treatment of the emulsion.

The water-soluble polysaccharide includes, for example, pectin, as well as hemicellulose derived from seeds of corn, rice, palm, coco palm, cotton, soybean, etc. Preferred examples of the water-soluble polysaccharide are those being capable of emulsifying protein solution and having a high viscosity in acidic condition. For example, water-soluble polysaccharide derived from soybean seed is preferably used.

The amount of the water-soluble polysaccharide can depend on the desired end product. Preferably, the amount is such that the water-soluble polysaccharide content of the protein emulsion may fall between 0.1 and 1.5% by weight, more preferably between 0.3 and 1.2% by weight.

The protein-containing acidic food and drink of the invention may contain various electrolytes. However, if there is an excess of electrolyte, then the protein emulsion will often coagulate or gel when it is processed at a high temperature so as to have a pH value lower than the isoelectric point of the protein existing therein. Therefore, it is desirable that the solvent consisting essentially of water, which is used to prepare the protein emulsion, contains no or few electrolytes. Accordingly, for some applications it is preferable and desirable that no electrolyte is added to the protein emulsion before the emulsion is subjected to the pH-controlling treatment at a high temperature.

Typical electrolytes include, for example, any one or more of mineral, water-soluble vitamin, amino acid, nucleic acid, etc.

Typical minerals include, for example, any one or more of sodium, calcium, potassium, iron, magnesium, manganese, zinc, selenium, etc.

Typical water-soluble vitamins include, for example, any one or more of ascorbic acid, thiamine, riboflavin, nicotinic acid, vitamin $B_6$, pantothenic acid, folic acid, vitamin $B_{12}$, biotin, choline, inositol, para-aminobenzoic acid, niacin, etc.

Typical amino acids include, for example, any one or more of aspartic acid, glutamic acid, glycine, threonine, methionine, tyrosine, arginine, lysine, etc.

Typical nucleic acids include, for example, any one or more of inosinic acid, guanylic acid, sodium ribonucleotide etc.

Apart from water-soluble polysaccharide, non-electrolyte, such as other saccharides and fat-soluble vitamin, may be added to the protein emulsion before the emulsion is subjected to the pH-controlling treatment at a high temperature.

The saccharide for use in the present invention which is not water-soluble polysaccharide can be typical saccharide. Typical saccharide include edible ones, including, for example, any one or more of dextrin, starch, cellulose, oligo-saccharide, di-saccharide, mono-saccharide, glycoalcohol, etc. The saccharide, if added to the protein emulsion, can reduce the sour taste of the final product, protein-containing acidic food and drink of the invention while improving the smoothness thereof. Therefore, the addition of saccharide is preferred.

The amount of the saccharide to be added can be dependent on the desired end product. However, the amount is preferably such that the saccharide content of the protein emulsion could be from 0.5 to 30% by weight, more preferably from 5 to 25% by weight.

Typical fat-soluble vitamins include, for example, any one or more of vitamin A, vitamin D, vitamin E, vitamin K, etc.

The protein emulsion having d pH value that is higher than the isoelectric point of the protein therein is, after heated, processed with sour or the like at a high temperature, preferably falling between 50 and 150° C., more preferably between 70 and 100° C., thereby to have a pH value that is lower than the isoelectric point of the protein. The time for which the emulsion is kept at such high temperature can be dependent on the desired end product. However, generally the time falls between 5 seconds and 30 minutes.

Typical sours include, for example, any one or more of fruit juice such as orange juice, grape juice, apple juice, etc.; organic acid such as citric acid, malic acid, gluconic acid, tartaric acid, lactic acid, acetic acid, etc.; and inorganic acid such as hydrochloric acid, etc. Preferred sour is organic acid, especially citric acid, malic acid and gluconic acid.

After the protein emulsion has been processed to have a pH value lower than the isoelectric point of the protein existing therein, any additive of electrolyte, non-electrolyte, sour and others, such as those noted above, and even flavoring, dye, etc. may be added thereto. After the additive has been added, the resulting emulsion is preferably homogenized in the same manner as in the emulsification noted above, for example, using any one or more of a colloid mill, a TK homo-mixer, a high-pressure homogenizer, an ultrahigh-pressure homogenizer or the like.

The protein-containing acidic food and drink of the invention may be produced by sterilizing, under heat in conventional manner, the protein emulsion that has been prepared in the manner mentioned above.

The protein-containing, acidic semi-solid food of the invention may be produced by adding a gelling agent to the protein emulsion having been prepared in the manner mentioned above, followed by sterilizing under heat the resulting gelled product. The gelled product may be directly used as it is, or, if desired, may be formed into jelly, pudding, etc.

As the gelling agent, any suitable edible gelling agent can be used. Typical gelling agents include, for example, any one or more of geranium gum, locust bean gum, guar gum, xanthane gum, carrageenan, konjak mannan, gelatin, agar, etc. In view of gelling ability, a preferred gelling agent is agar. The amount of the gelling agent to be added may be varied, depending on the desired taste and feel of the products to be produced. For example, when agar is used as the gelling agent, its amount may be generally from 0.1 to 1.0% by weight of the resultant product.

In the method of the present invention, the protein emulsion, while being processed, is prevented from coagulating. Therefore, the method of the invention is favorable to the production of protein-containing acidic food and drink, especially those containing a large amount of electrolyte such as mineral, vitamin, amino acid, nucleic acid, etc.

The present invention also covers, protein-containing acidic food and drink which contains protein, fat and oil, and water-soluble polysaccharide and in which the dispersed particles have a mean particle size of not greater than 15 $\mu$m. Also covered are such foods and drinks containing protein, fat and oil, and water-soluble polysaccharide, in which the dispersed particles have a mean particle size of not greater than 15 $\mu$m and/or and the having the viscosity of not greater than 20 cPs. Preferably, the food and drink is made by the method of the present invention.

In the food and drink, the protein, fat and oil and water-soluble polysaccharide means the same as defined above. The protein content of the food and drink may typically fall between 0.1 and 10% by weight, but preferably between 0.5 and 7% by weight. The fat and oil content may typically fall between 0.1 and 10% by weight, preferably they fall between 0.5 and 6% by weight. The water-soluble polysaccharide content may typically fall between 0.1 and 1.5% by weight, preferably, it falls between 0.3 and 1.2% by weight. For example, for thick liquid diet, it is desirable that the protein content thereof and the fat and oil content thereof are both not less than 1.0% by weight.

The food and drink may contain, in addition to the one or more of the protein, fat and oil and water-soluble polysaccharide noted above, any one or more of electrolyte, non-electrolyte except water-soluble polymer, sour, gelling agent, etc. In such instances, the additional electrolyte, non-electrolyte except water-soluble polymer, sour and gelling agent may be the same as those defined above. For example, for thick liquid diet, it is desirable that it contains non-electrolyte except water-soluble polymer, especially saccharide in an amount of not less than 6.0% by weight. Where sour is added to the food and drink, organic acid is preferably used as sour. However, if the total normality of lactic acid and acetic acid existing in the food and drink is greater than 50% of the total normality of all organic acids existing therein, the food and drink will lose a good taste for refreshment. Therefore, it is desirable that the total normality of lactic acid and acetic acid to be in the food and drink is not greater than 50% of the total normality of all organic acids therein.

The dispersed particles as referred to herein mean colloidal particles and the like that are in the food and drink in the form of a dispersion. The mean particle size of the dispersed particles may be measured, for example, by using a particle size distribution meter. Where the protein-containing acidic food and drink contains a gelling agent, it is heated and melted at a temperature not lower than the melting point of the gelling agent, and then diluted 500-fold or more with hot water, and thereafter the mean particle size of the particles dispersed in the resulting melt may be measured with a particle size distribution meter.

The viscosity of the protein-containing acidic drink of the invention may be measured at 20° C., using a B-type viscometer.

Regarding the physical properties of protein-containing acidic food and drink, it is important that the particles dispersed therein have a mean particle size of not greater than 15 μm, preferably not greater than 10 μm, in order that the food and drink is not rough to the throat or tongue but has a soft and smooth taste. In particular, for protein-containing acidic drink, it is preferable that the viscosity of the drink is not greater than 20 cPs in such instances the drink has a desirable smoothness. On the other hand, for protein-containing, acidic semi-solid food, it is desirable that the viscosity of the food, to which a gelling agent is not as yet added, is not greater than 20 cPs.

The invention will now be described in more detail and with reference to the following Examples and Comparative Examples, which, however, are not intended to restrict the scope of the invention.

In the following Examples and Comparative Examples, "%" except the degree of water separation in Example 4 and molar ratio in Example 7 means "% by weight".

EXAMPLE 1

A solution having the following compositions was prepared by dissolving the following components in water; 14.6% dextrin, 3.25% sodium casein, 3.2% salad oil, 0.8% polyglycerin fatty acid ester, and 1.2% water-soluble soybean fiber (manufactured by Fuji Oil Co.). Citric acid was added to the solution, by which the solution was made to have a pH of 6.5. Then, the solution was pre-emulsified using a TK homo-mixer (manufactured by Tokushu Kika Kogyo KK) at 5000 rpm for 5 minutes, and then emulsified using a high-pressure homogenizer (manufactured by Raney Co.) under a pressure of 300 kg/cm$^2$. The resulting emulsion was heated at 80° C. and kept at the temperature for 30 minutes, and, at the end of the heating, citric acid was added thereto by which the emulsion was made to have a pH of 3.9. After the pH control, the following components were added to the emulsion to have the following concentration; 1.47 g/liter calcium chloride, 2.06 g/liter magnesium sulfate and 1.7 g/liter dipotassiumhydrogen phosphate, which was then homogenized using a high-pressure homogenizer under a pressure of 300 kg/cm$^2$. After homogenization, the emulsion was sterilized at 100° C. for 10 minutes, and then charged into bottles. Thus was produced a liquid nutrient according to the present invention.

Comparative Example 1

A solution having the following compositions was prepared by dissolving the following components in water; 14.6% dextrin, 3.25% sodium casein, 3.2% salad oil, 0.8% polyglycerin fatty acid ester, and 1.2% water-soluble soybean fiber. Citric acid was added to the solution, by which the solution was made to have a pH of 6.5. Then, the solution was pre-emulsified using a TK homo-mixer at room temperature at 5000 rpm for 5 minutes, and then emulsified using a high-pressure homogenizer at room temperature under a pressure of 300 kg/cm$^2$. The resulting emulsion was heated at 80° C. and kept at the temperature for 30 minutes, and thereafter cooled to 20° C. Then, citric acid was added thereto by which the emulsion was made to have a pH of 3.9. After the pH control, the following components were added to the emulsion to have the following concentration; 1.47 g/liter calcium chloride, 2.06 g/liter magnesium sulfate and 1.7 g/liter dipotassiumhydrogen phosphate, which was then homogenized using a high-pressure homogenizer under a pressure of 300 kg/cm$^2$. After homogenization, the emulsion was sterilized at 100° C. for 10 minutes, and then charged into bottles. Thus was produced a liquid nutrient.

Comparative Example 2

A solution having the following compositions was prepared by dissolving the following components in water; 14.6% dextrin, 3.25% sodium casein, 3.2% salad oil, 0.8% polyglycerin fatty acid ester, and 1.2% water-soluble soybean fiber. Citric acid was added to the solution, by which the solution was made to have a pH of 3.9. After the pH control, the solution was pre-emulsified using a TK homo-mixer at 5000 rpm for 5 minutes, and then emulsified using a high-pressure homogenizer under a pressure of 300 kg/cm$^2$. The resulting emulsion was heated at 80° C. and kept at the temperature for 30 minutes, and thereafter cooled to 20° C. Then, the following components were added to the emulsion to have the following concentration; 1.47 g/liter calcium chloride, 2.06 g/liter magnesium sulfate and 1.7 g/liter dipotassiumhydrogen phosphate, which was then homogenized using a high-pressure homogenizer under a pressure of 300 kg/cm$^2$. After homogenization, the emulsion was sterilized at 100° C. for 10 minutes, and then charged into bottles. Thus was produced a liquid nutrient.

Comparative Example 3

A solution having the following compositions was prepared by dissolving the following components in water; 14.6% dextrin, 3.25% sodium casein, 3.2% salad oil, 0.8 % polyglycerin fatty acid ester, and 1.2% water-soluble soybean fiber. Citric acid was added to the solution, by which the solution was made to have a pH of 3.9. The resulting solution was pre-emulsified using a TK homo-mixer at 5000 rpm for 5 minutes, and then emulsified using a high-pressure homogenizer under a pressure of 300 kg/cm$^2$. Then, the following components were added to the resulting emulsion to have the following concentration; 1.47 g/liter calcium chloride, 2.06 g/liter magnesium sulfate and 1.7 g/liter dipotassiumhydrogen phosphate, which was then homogenized using a high-pressure homogenizer under a pressure of 300 kg/cm$^2$. After homogenization, the emulsion was sterilized at 100° C. for 10 minutes, and then charged into bottles. Thus was produced a liquid nutrient.

Comparative Example 4

A solution having the following compositions was prepared by dissolving the following components in water; 14.6% dextrin, 3.25% sodium casein, 3.2% salad oil, 0.8% polyglycerin fatty acid ester, and 1.2% water-soluble soybean fiber. Citric acid was added to the solution, by which the solution was made to have a pH of 6.5. The resulting solution was pre-emulsified using a TK homo-mixer at 5000 rpm for 5 minutes, and then emulsified using a high-pressure homogenizer under a pressure of 300 kg/cm². Then, the following components were added to the resulting emulsion to have the following concentration; 1.47 g/liter calcium chloride and 2.06 g/liter magnesium sulfate, which was then heated and kept at 80° C. for 30 minutes. At the end of the heating, citric acid was added to the emulsion, by which the emulsion was made to have a pH of 3.9. After the pH control, dipotassiumhydrogen phosphate was added to the emulsion to have 1.7 g/liter dipotassiumhydrogen phosphate, which was then homogenized using a high-pressure homogenizer under a pressure of 300 kg/cm². After homogenization, the emulsion was sterilized at 100° C. for 10 minutes, and then charged into bottles. Thus was produced a liquid nutrient.

Comparative Example 5

A solution having the following compositions was prepared by dissolving the following components in water; 14.6% dextrin, 3.25% sodium casein, 3.2% salad oil, 0.8% polyglycerin fatty acid ester, and 1.2% water-soluble soybean fiber. Citric acid was added to the solution, by which the solution was made to have a pH of 6.5. The resulting solution was pre-emulsified using a TK homo-mixer at 5000 rpm for 5 minutes, and then emulsified using a high-pressure homogenizer under a pressure of 300 kg/cm². Then, the following components were added to the emulsion to have the following concentration; 1.47 g/liter calcium chloride and 2.06 g/liter magnesium sulfate were added to the resulting emulsion. Next, citric acid was added thereto at room temperature, by which the emulsion was made to have a pH of 3.9. After the pH control, dipotassiumhydrogen phosphate was added to the emulsion to have 1.7 g/liter dipotassiumhydrogen phosphate was added to the emulsion, which was then homogenized using a high-pressure homogenizer under a pressure of 300 kg/cm². After homogenization, the emulsion was sterilized at 100° C. for 10 minutes, and then charged into bottles. Thus was produced a liquid nutrient.

Test Results

The viscosity of the liquid nutrients obtained in Example 1 and Comparative Examples 1 to 5 were measured. In addition, these liquid nutrients were tested for their condition as to whether or not the proteins therein coagulated, and for their roughness as to whether or not they are rough feel to the throat or tongue. Precisely, the viscosity of each sample was measured with a B-type viscometer (manufactured by Tokyo Keiki KK) at 20° C. For the protein coagulation, the samples were left for 1 week, and checked for the presence or absence of precipitate formed therein. As a result of the visual observation, the samples were grouped into 6 ranking groups. In the first ranking designated by "−", the samples gave no precipitate; in the second ranking designated by "+", the samples gave minor precipitate; in the third ranking designated by "++", the samples gave a little precipitate; in the fourth ranking designated by "+++", the samples gave precipitate; in the fifth ranking designated by "++++", the samples gave much precipitate; and in the sixth ranking designated by "+++++", the samples gave great precipitate. For their roughness, the samples were sensually tested by 5 panelists. As a result of the sensual test, the samples were grouped into 6 ranking groups. In the first ranking designated by "−", the samples were not rough at all; in the second ranking designated by "+", the samples were slightly rough; in the third ranking designated by "++", the samples were somewhat rough; in the fourth ranking designated by "+++", the samples were rough; in the fifth ranking designated by "++++", the samples were much rough; and in the sixth ranking designated by "+++++", the samples were greatly rough.

The test data obtained are shown in Table 1 below.

TABLE 1

|  | Viscosity (cPs) | Coagulation | Roughness |
| --- | --- | --- | --- |
| Example 1 | 9.0 | − | − |
| Comparative Example 1 | 183.0 | ++++ | ++++ |
| Comparative Example 2 | 190.0 | ++++ | ++++ |
| Comparauve Example 3 | 870.0 | ++++ | ++++ |
| Comparative Example 4 | 12.6 | +++++ | +++++ |
| Comparative Example 5 | 380.0 | ++++ | ++++ |

As shown in Table 1, the liquid nutrient obtained in Example 1 had a low viscosity, and did not coagulate at all. In addition, it had a good and smooth taste. As opposed to this, the liquid nutrient obtained in Comparative Example 1, in which the protein emulsion was cooled before it passed through its isoelectric point; those obtained in Comparative Examples 2 and 3, in which the protein solution was emulsified after having passed through its isoelectric point; and those obtained in Comparative Examples 4 and 5, in which some mineral was added to the protein emulsion before the emulsion passed through its isoelectric point all had a high viscosity and greatly coagulated, and, in addition, they had a bad taste as being not smooth.

EXAMPLE 2

A solution having the following compositions was prepared by dissolving the following components in water; 14.6% dextrin, 3.25% sodium casein, 3.2% salad oil, 0.8% polyglycerin fatty acid ester, and 1.2% water-soluble soybean fiber. Citric acid was added to the solution, by which the solution was made to have a pH of 6.5. After the pH control, the solution was pre-emulsified using a TK homo-mixer at 5000 rpm for 5 minutes, and then emulsified using a high-pressure homogenizer under a pressure of 300 kg/cm². The resulting emulsion was heated at 80° C. and kept at the temperature for 30 minutes, and, at the end of the heating, citric acid was added thereto by which the emulsion was made to have a pH of 3.9. After the pH control, the following components were added to the emulsion to have the following concentration; 1.47 g/liter calcium chloride, 2.06 g/liter magnesium sulfate, 1.7 g/liter dipotassiumhydrogen phosphate and 0.5% microcrystalline cellulose (manufactured by Asahi Chemical Industry Co.), which was then homogenized using a high-pressure homogenizer under a pressure of 300 kg/cm². After having been thus homogenized, the emulsion was sterilized at 100° C. for 10 minutes, and then charged into bottles. Thus was produced a liquid nutrient.

The liquid nutrient obtained herein was stored at 30° C. for a half year, and the sample thus-stored was tested for the emulsion stability and the suspension stability. For the emulsion stability, the sample was evaluated in three ranks, the first ranking being directed to the case with good emulsion condition, the second ranking to the case in which water separation and cream lines are seen, and the third ranking to the case in which oil-off layers, water separation and cream lines are all seen. As a result of the test, none of oil-off layers, water separation and cream lines is seen in the tested sample. This supports good emulsion stability of the liquid nutrient. For the suspension stability, the sample was checked for the viscosity change before and after the storage, and in addition, the stored sample was further checked for the presence or absence of precipitate formed therein. As a result of the test, no viscosity change was found before and after the storage, and no precipitate was found in the stored sample. This supports good suspension stability of the liquid nutrient.

EXAMPLE 3

A solution having the following compositions was prepared by dissolving the following components in water; 6.6% dextrin, 8.0% granulated sugar, 3.25% sodium casein, 3.2% salad oil, 0.8% polyglycerin fatty acid ester, and 1.2% water-soluble soybean fiber. Citric acid was added to the solution, by which the solution was made to have a pH of 6.5. After the pH control, the solution was pre-emulsified using a TK homo-mixer at 5000 rpm for 5 minutes, and then emulsified using a high-pressure homogenizer under a pressure of 300 kg/cm$^2$. The resulting emulsion was heated at 80° C. and kept at the temperature for 30 minutes, and, at the end of the heating, citric acid was added thereto by which the emulsion was made to have a pH of 3.9. After the pH control, the following components were added to the emulsion to have the following concentration; 1.47 g/liter calcium chloride, 2.06 g/liter magnesium sulfate, 1.7 g/liter dipotassiumhydrogen phosphate, 1 g/liter vitamin mix., 0.1% orange flavoring and 5% orange juice, which was then homogenized using a high-pressure homogenizer under a pressure of 300 kg/cm$^2$. After homogenization, the emulsion was sterilized at 100° C. for 10 minutes, and then charged into bottles. Thus was produced a liquid nutrient.

The liquid nutrient obtained herein was sensually tested by 5 panelists for its flavor and taste in a 5-point method in which the case with point 5 is the best. As a result, the liquid nutrient gained point 5, while a commercial product of neutral liquid nutrient gained point 3 and a commercial product of yogurt gained point 3. As shown in the test data obtained herein, even persons who do not like the flavor and taste of fermented milk and lactic acid drinks feel that the liquid nutrient produced herein has good flavor and taste.

EXAMPLE 4

A solution having the following compositions was prepared by dissolving the following components in water; 7.3% dextrin, 7.3% granulated sugar, 3.25% sodium casein, 3.2% salad oil, 0.8% polyglycerin fatty acid ester, and 1.2% water-soluble soybean fiber. Citric acid was added to the solution, by which the solution was made to have a pH of 6.5. After the pH control, the solution was pre-emulsified using a TK homo-mixer at 5000 rpm for 5 minutes, and then emulsified using a high-pressure homogenizer under a pressure of 300 kg/cm$^2$. The resulting emulsion was heated at 80° C. and kept at the temperature for 30 minutes, and, at the end of the heating, gluconic acid was added thereto by which the emulsion was made to have a pH of 3.9. After the pH control, the following components were added to the emulsion to have the following concentration; 1.47 g/liter calcium chloride, 2.06 g/liter magnesium sulfate, 1.7 g/liter dipotassiumhydrogen phosphate, 0.1% orange flavoring (manufactured by Kyowa Flavoring Chemical Co.) and 5% orange juice, and, in addition, 0.9% carrageenan and 0.6% (v/v) locust bean gum. Next, the resulting mixture was homogenized using a high-pressure homogenizer under a pressure of 300 kg/cm$^2$. After homogenization, the emulsion was sterilized at 100° C. for 10 minutes, then put into cups, and formed into jellies.

The jellies were cut into columnar samples having a diameter of 25 mm and a height of 15 mm, which were put on filter paper spread over a laboratory dish, and kept as they were at 20° C. for 60 minutes. The amount of water having transferred from each sample to the filter paper was then measured, and the degree of water separation from the jelly sample was obtained according to the following equation.

Degree of Water Separation (%) =[weight of filter paper after test (g)−weight of filter paper before test (g)]/weight of sample (g)×100

The degree of water separation from the jellies obtained herein was 1%, which indicates that little water separated from the jellies. In addition, the jellies were sensually tested in the same manner as in Example 3, and all gained point 5. In the same test, however, commercial jellies gained point 3. The test data indicate that the jellies obtained herein had good flavor and taste.

EXAMPLE 5

A solution having the following compositions was prepared by dissolving the following components in water; 4.6% dextrin, 10.0% granulated sugar, 3.25% sodium casein, 3.2% salad oil, 0.8% polyglycerin fatty acid ester, and 1.2% water-soluble soybean fiber. Citric acid was added to the solution, by which the solution was made to have a pH of 6.5. After the pH control, the solution was pre-emulsified using a TK homo-mixer at 5000 rpm for 5 minutes, and then emulsified using a high-pressure homogenizer under a pressure of 300 kg/cm$^2$. The resulting emulsion was heated at 80° C. and kept at the temperature for 30 minutes, and, at the end of the heating, gluconic acid was added thereto by which the emulsion was made to have a pH of 3.9. After the pH control, the following components were added to the emulsion to have the following concentration; 1.47 g/liter calcium chloride, 2.06 g/liter magnesium sulfate, 1.7 g/liter dipotassiumhydrogen phosphate, 1 g/liter vitamin mix, 0.1% grape flavoring (manufactured by Kyowa Flavoring Chemical Co.) and 5% muscat juice, and, in addition, 0.2% agar. Next, the resulting mixture was homogenized using a high-pressure homogenizer under a pressure of 300 kg/cm$^2$. After homogenization, the emulsion was sterilized at 100° C. for 10 minutes, then put into standing pouch, and formed into jellies.

The jellies thus obtained herein were evaluated for their flavor and taste in the same manner as in Example 3, and tested for the roughness in the same manner as in Example 1. The results were that the jellies of this Example gained point 5 for their flavor and taste, while commercial jellies gained point 4. For the rough feel to the throat or tongue, all the panelists evaluate that the jellies of this Example were not rough. The test results indicate that the jellies obtained herein had a good taste and had no rough feel to the throat or tongue.

EXAMPLE 6

A solution having the following compositions was prepared by dissolving the following components in water; 14.6% dextrin, 3.25% sodium casein, 3.2% salad oil, 0.8% polyglycerin fatty acid ester, and 1.2% water-soluble soybean fiber. Citric acid was added to the solution, by which the solution was made to have a pH of 6.5. Next, the solution was pre-emulsified using a TK homo-mixer at 5000 rpm for 5 minutes, and then emulsified using a high-pressure homogenizer under a pressure of 300 kg/cm². The resulting emulsion was heated at 40, 50, 60, 70 or 80° C. and kept at the temperature for 30 minutes, and, at the end of the heating, citric acid was added thereto by which the emulsion was made to have a pH of 3.9. After the pH control, the following components were added to the emulsion to have the following concentration; 1.47 g/liter calcium chloride, 2.06 g/liter magnesium sulfate and 1.7 g/liter dipotassiumhydrogen phosphate. Next, the resulting mixture was homogenized using a high-pressure homogenizer under a pressure of 300 kg/cm². After homogenization, the emulsion was sterilized at 100° C. for 10 minutes, and then charged into bottles. Thus were produced liquid nutrients.

The mean particle size and the viscosity of each liquid nutrient were measured, and, in addition, the liquid nutrients were tested for the taste including the rough feel, if any, to the throat or tongue. The overall evaluation of each liquid nutrient was derived from the test results obtained.

Specifically, the mean particle size of the particles dispersed in each liquid nutrient obtained herein was measured, using a particle size distribution meter (HELOS, manufactured by Sympatech Co.). The viscosity at 20° C. of each liquid nutrient was measured, using a B-type viscometer (manufactured by Tokyo Keiki KK). For the overall evaluation of each liquid nutrient, five panelists sensually tested all liquid nutrients for the taste and the rough feel to the throat or tongue. Regarding the rough feel to the throat or tongue, the samples tested were grouped into 6 ranking groups in the same manner as in Example 1. Regarding the taste, the samples tested were grouped into 4 ranking groups. The taste of the samples in the fourth ranking was bad; that of the samples in the third ranking was relatively bad; that of the samples in the second ranking was relatively good; and that of the samples in the first ranking was good. Regarding the overall evaluation, the samples tested were grouped into 5 ranking groups. The samples that gained point 5 were the best and in the first ranking, and those that gained point 1 were the worst and in the fifth ranking.

The test results are in Table 2 below.

TABLE 2

| Temperature (° C.) | Mean Particle Size (μm) | Viscosity (cPs) | Roughness | Taste | Overall Evaluation |
|---|---|---|---|---|---|
| 40 | 16.2 | 28.7 | +++++ | bad | 1 |
| 50 | 13.4 | 17.2 | +++ | relatively bad | 3 |
| 60 | 12.2 | 11.2 | ++ | relatively good | 4 |
| 70 | 8.2 | 9.9 | − | good | 5 |
| 80 | 6.9 | 9.2 | − | good | 5 |

As shown in Table 2, the samples that had been heated at 50° C. had a viscosity lower than 20 cPs, and their taste was evaluated to be acceptable by the panelists. On the other hand, the samples that had been heated at 70° C. or higher had a viscosity of much lower than 20 cPs and had a mean particle size of smaller than 10 μm, and their taste was evaluated good by the panelists.

EXAMPLE 7

Liquid nutrients were produced in the same manner as in Example 1 except that a mixture of acids as prepared in the ratio indicated in Table 3 below was used as the sour to be added to the emulsion, in place of citric acid.

The liquid nutrients produced herein were sensually tested by 5 panelists for their taste for refreshment. The liquid nutrients tested were grouped into 5 ranking groups. The liquid nutrients that gained point 5 as having a good taste for refreshment were the best and in the first ranking, and those that gained point 1 as having no taste for refreshment were the worst and in the fifth ranking.

The test results are in Table 3.

TABLE 3

|  | Molar Ratio | | | | | | |
|---|---|---|---|---|---|---|---|
|  | 10/0 | 8/2 | 6/4 | 5/5 | 4/6 | 2/8 | 0/10 |
| malic acid/ lactic acid | 5 | 5 | 4 | 3 | 2 | 1 | 1 |
| gluconic acid/ lactic acid | 5 | 4 | 3 | 2 | 1 | 1 | i |
| citric acid/ lactic acid | 5 | 5 | 4 | 3 | 2 | 1 | 1 |

As shown in Table 3, when the sour comprising lactic acid in a molar ratio of not greater than 50% relative to the total mols of the organic acids constituting it was used, the liquid nutrients obtained had a good taste for refreshment.

EXAMPLE 8

To 500 g of water were added: 170 g of dextrin, 36 g of sodium casein, 16 g of soybean oil, 16 g of rape-seed oil, 1.8 g of polyglycerin fatty acid ester, and 12 g of water-soluble, -edible soybean fiber. The resulting solution (pH: about 6.5) was pre-emulsified using a TK homo-mixer at 5000 rpm for 5 minutes, and then emulsified using a high-pressure homogenizer under a pressure of 300 kg/cm². The resulting emulsion was heated at 80° C. and kept at the temperature for 30 minutes, and, at the end of the heating, 4.1 g of 90% lactic acid and 20.3 g of 50% gluconic acid were added thereto by which the emulsion was made to have a pH of 3.9. After the pH control, 1.11 g of calcium chloride, 2.06 g of magnesium sulfate, 2.26 g of dipotassiumhydrogen phosphate and 9 mg of iron sodium citrate were added to the emulsion, and 2.1 g of agar was added thereto. Then, water was added thereto to make it have a volume of one liter. This was then homogenized using a high-pressure homogenizer under a pressure of 300 kg/cm². After homogenization, the emulsion was sterilized at 100° C. for 10 minutes, and then charged into standing pouch. Thus was produced a liquid nutrient having a pH value of 3.9. The mean particle size of the particles dispersed therein was 6.9 μm. The liquid nutrient contained the following components:

| Dextrin | 17.0% |
|---|---|
| Sodium Casein | 3.6% |
| Soybean Oil | 1.6% |
| Rape-seed Oil | 1.6% |
| Polyglycerin Fatty Acid Ester | 0.18% |
| Water-soluble, Edible Soybean Fiber | 1.2% |
| 90% Lactic Acid | 0.41% |
| 50% Gluconic Acid | 2.03% |
| Calcium Chloride | 0.111% |
| Magnesium Sulfate | 0.206% |
| Dipotassiumhydrogen Phosphate | 0.226% |
| Iron Sodium Citrate | 0.0009% |
| Agar | 0.21% |

As has been mentioned in detail hereinabove, the present invention provides protein-containing acidic food and drink which is smooth, tasteful, palatable and have good storage stability, and a method for producing thereof.

While the invention has been described in detail and with reference to specific embodiments thereof, it will be apparent to one skilled in the art that various changes and modifications can be made therein without departing from the spirit and scope thereof.

What is claimed is:

1. A method for producing a protein-containing acidic food and drink, which comprises processing a protein emulsion having a pH value that is higher than the isoelectric point of the protein in the emulsion at a temperature in the range of 50° to 150° C. to make the emulsion having a pH value that is lower than the isoelectric point of the protein.

2. The method according to claim 1, wherein the protein emulsion is prepared by adding fat and oil to a protein solution and emulsifying the resulting mixture.

3. The method according to claim 1 or 2, wherein the protein emulsion contains water-soluble polysaccharide.

4. The method according to claim 1, wherein an electrolyte is added to the emulsion after the emulsion has been processed to have a pH value that is lower than the isoelectric point of the protein therein.

5. The method according to claim 4, wherein the electrolyte is at least one of mineral, water-soluble vitamin, amino acid and nucleic acid.

6. The method according to claim 1, wherein the protein is casein.

7. The method according to claim 1, wherein said temperature is in the range of 70°–100° C.

8. The method according to claim 1, wherein the protein emulsion is maintained at said temperature for a time in the range of 5 seconds to 30 minutes.

9. A protein-containing acidic food and drink obtainable by the method according to any one of claims 1, 2, 4 or 5.

10. The protein-containing acidic food and drink according to claim 9, which contains additionally fat and oil, and water-soluble polysaccharide, and in which particles dispersed have a mean particle size of not greater than 15 μm.

11. The protein-containing food and drink according to claim 10, wherein said particles have a mean particle size not greater than 10 μm.

12. The food and drink according to claim 9, which contains sour.

13. The food and drink according to claim 12, wherein the sour is organic acid.

14. The food and drink according to claim 13, wherein the organic acid comprises lactic acid and acetic acid and wherein the total normality of lactic acid and acetic acid in the organic acid is not greater than 50% of the total normality of the organic acid.

15. The food and drink according claim 9, which contains saccharide.

16. The food and drink according to claim 9, which has a pH value falling between 2.5 and 5.0.

17. The food and drink according to claim 9, wherein the protein is casein.

18. The food and drink according to claim 17, which has a pH value falling between 2.5 and 4.0.

19. The food and drink according to claim 9, which contains additionally fat and oil, and water-soluble polysaccharide, in which particles dispersed have a mean particle size of not greater than 15 μm and/or which has a viscosity of not greater than 20 centipoises (cPs), the food and drink being a protein-containing drink.

20. The drink according to claim 19, which contains sours.

21. The drink according to claim 20, wherein the sour is organic acid.

22. The drink according to claim 21, wherein the organic acid comprises lactic acid and acetic acid and wherein the total normality of lactic acid and acetic acid in the organic acid is not greater than 50% of the total normality of the organic acid.

23. The drink according to claim 19, which contains saccharide.

24. The drink according to claim 19, which has a pH value falling between 2.5 and 5.0.

25. The drink according to claim 19, wherein the protein is casein.

26. The drink according to claim 25, which has a pH value falling between 2.5 and 4.0.

27. The drink according to claim 19, which has a viscosity of not greater than 20 centipoises.

28. The protein-containing food and drink according to claim 9, wherein the protein has an isoelectric point that falls within a pH range between 3.5 and 7.

29. The protein-containing food and drink according to claim 9, further comprising a gelling agent added after said processing, thereby to form a gelled product which is a protein-containing food.

* * * * *